(12) United States Patent
Chandrasekharan et al.

(10) Patent No.: US 7,873,154 B2
(45) Date of Patent: Jan. 18, 2011

(54) APPARATUS, SYSTEM, AND METHOD FOR REMOTE MANAGEMENT CONSOLE FOR BUSINESS INTEGRATION SCENARIOS

(75) Inventors: Sivakumar Chandrasekharan, Alameda, CA (US); Rajesh Gurumoorthy, Burlingame, CA (US); Yury Kosov, San Francisco, CA (US); Canh Minh Vu, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 11/378,067

(22) Filed: Mar. 17, 2006

(65) Prior Publication Data

US 2007/0220084 A1    Sep. 20, 2007

(51) Int. Cl.
*H04M 3/00* (2006.01)
*H04M 5/00* (2006.01)
*G06Q 10/00* (2006.01)

(52) U.S. Cl. .................................. 379/265.02; 705/1.1

(58) Field of Classification Search ............ 379/265.02; 705/1, 9, 1.1, 8
See application file for complete search history.

(56) References Cited

U.S. PATENT DOCUMENTS

| | | | |
|---|---|---|---|
| 6,381,579 B1 | 4/2002 | Gervais et al. | 705/8 |
| 2004/0255289 A1 | 12/2004 | Alex George et al. | 717/174 |
| 2005/0198201 A1 | 9/2005 | Bohn et al. | 709/218 |
| 2006/0026007 A1* | 2/2006 | Stephanou | 705/1 |
| 2009/0119150 A1* | 5/2009 | Stephanou | 705/9 |

* cited by examiner

*Primary Examiner*—Thjuan K Addy
(74) *Attorney, Agent, or Firm*—Kunzler Needham Massey & Thorpe

(57) ABSTRACT

An apparatus and method for providing a remote management console for business integration scenarios. The apparatus may be implemented as a computer program product comprising a computer useable medium of computer-readable program. A computer, when executing the computer readable program retrieves environment information from a customer integration server; customizes a business integration solution according to the retrieved environment information; and deploys the customized business integration solution to the customer integration server.

26 Claims, 5 Drawing Sheets

APPARATUS, SYSTEM, AND METHOD FOR REMOTE MANAGEMENT CONSOLE FOR BUSINESS INTEGRATION SCENARIOS

BACKGROUND OF THE INVENTION

1. Field of the Invention

This invention relates to deploying a business integration solution and more particularly relates to remotely deploying a business integration solution to a business integration server.

2. Description of the Related Art

Many large companies utilize enterprise information systems (EISs) to store critical company data. For example, a photography equipment mail order warehouse may use an EIS to track customer orders, inventory levels, client invoicing, shipment tracking, client billing, accounts payable as well as employee timekeeping and employee benefits.

However, a company does not leverage the true value of an EIS unless the business logic and business rules control the companywide flow of work, data, products, and the like. For example, tracking inventory levels of the photography warehouse is simply a database function. Implementing business logic in the EIS that generates a purchase request to a supplier when an inventory level for a hot camera drops below a pre-determined level begins to realize the value of an EIS. Further fulfillment logic may include requiring a receiving clerk to visually inspect and scan received items such that the scanning process modifies inventory levels.

To complicate matters further, many enterprises utilize multiple EISs. One EIS may handle inventory while a separate EIS may handle accounts receivables. An inventory replenishment purchase order from an inventory EIS may need to be processed by an accounting EIS prior to placing the order. A company with multiple EISs frequently needs to communicate an operation on one EIS with another EIS or to move data in one format on one EIS to a second format on a second EIS.

Many vendors create business logic modules to assist enterprises in managing the flow of work and data through their businesses, including the translation of data from one EIS to another. A business logic module may encapsulate business logic to control the flow of work and data in an enterprise. However, from one company to another, the specific implementations of EISs vary to such a great degree that it is difficult to implement the business logic that distinct enterprises may deploy. A vendor of a business logic module must create a business logic module specific to each company. In addition, as a vendor implements a business logic module, the vendor desires to provide a secure and convenient method of deploying the business logic module in the customer's environment.

From the foregoing discussion, it should be apparent that a need exists for an apparatus, system, and method that allows a vendor to implement business logic modules that may be easily deployed to multiple customers in a secure and convenient fashion. Beneficially, such an apparatus, system, and method would allow enterprise customers to rapidly select and deploy business logic provided by business logic module vendors.

SUMMARY OF THE INVENTION

The present invention has been developed in response to the present state of the art, and in particular, in response to the problems and needs in the art that have not yet been fully solved by currently available application servers. Accordingly, the present invention has been developed to provide an apparatus in the form of a computer program product and method providing a remote management console for business integration scenarios that overcome many or all of the above-discussed shortcomings in the art.

The computer program product providing a remote management console for business integration scenarios is provided with a plurality of modules configured to functionally execute the necessary steps of customizing and deploying a business integration solution. These modules in the described embodiments include a vendor interface module, a customer environment module, a customization module, a deployment module, and optionally a presentation module.

The computer program product, in one embodiment, is configured to retrieve environment information from a customer integration server; customize a business integration solution according to the retrieved environment information; and deploy the customized business integration solution to the customer integration server.

The computer program product is further configured, in one embodiment, to retrieve the business integration solution from a vendor integration server. In one embodiment, the business integration solutions retrieved from the vendor integration server are generic solutions that the product customizes at deployment-time according to retrieved environment information.

In a further embodiment, the computer program product may be configured to receive initiation requests from a customer browser.

In a further embodiment, the computer program product retrieves environment information from a plurality of target customer integration servers and customizes business integration differently for each target customer integration server according to the environment information retrieved from each target customer integration server.

In a further embodiment, the environment information retrieved from the customer integration server may comprise information related to an interchange server repository including interchange server repository file system path, interchange server repository type, interchange server repository version, interchange server repository network path, and interchange server repository authentication information.

In a further embodiment, the computer program product further retrieves a set of business integration solutions from a vendor integration server; presents at least one of the set of business integration solutions to a user of the customer browser; accepts a selection of a business integration solution; and prompts the user of the customer browser with a choice of deployment actions with respect to deploying the selected business integration solution onto the customer integration server. The deployment actions may include overwriting a similarly named business integration solution on the customer integration server with the selected business integration solution and archiving a similarly named business integration solution to prevent loss of the similarly named business integration solution in response to deployment of the selected business integration solution.

In a further embodiment, the computer program product may deploy a business integration solution using a transport mechanism for communication between the customer integration server and the business integration solution using one of the following technologies: Java Message Service (JMS), TCP/IP, COM, CORBA, HTTP, HTTPS, and JDBC.

In a further embodiment, the computer program product may deploy a business integration solution that communicates with a plurality of Enterprise Information Systems (EISs) and wherein the business integration solution implements a set of business rules to integrate a business process of a first EIS with a business process of a second EIS.

In a further embodiment, the computer program product may deploy a business integration solution that comprises business logic and data in the form of one or more of Java class files, Java byte code, and Java source code, and wherein the business integration solution executes on a Java application server.

In a further embodiment, the computer program product may deploy a business integration solution that comprises mappings to convert individual fields in a first business object received from a first EIS to individual fields in a second business object useable by a second EIS.

In a further embodiment, the computer program product is configured to deploy the business integration solutions using encryption over a public network.

In a further embodiment, the computer program product deploys the business integration solution onto IBM WebSphere.

A method for deploying computer infrastructure of the present invention is also presented. The method substantially includes the steps necessary to deploy computing infrastructure of the present invention. In one embodiment, the method includes receiving customer integration server connection information; executing a deployment utility configured to integrate a business integration solution into a remote customer integration server; and confirming deployment of the customized business integration solution to the customer integration server. The deployment utility may be configured to retrieve environment information from a customer integration server; customize a business integration solution according to the retrieved environment information; and deploy the customized business integration solution to the customer integration server.

In further embodiments, the deployment utility may be configured to deploy business integration solutions consistent with the business integration solutions described with response to the various embodiments of the computer program product described above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
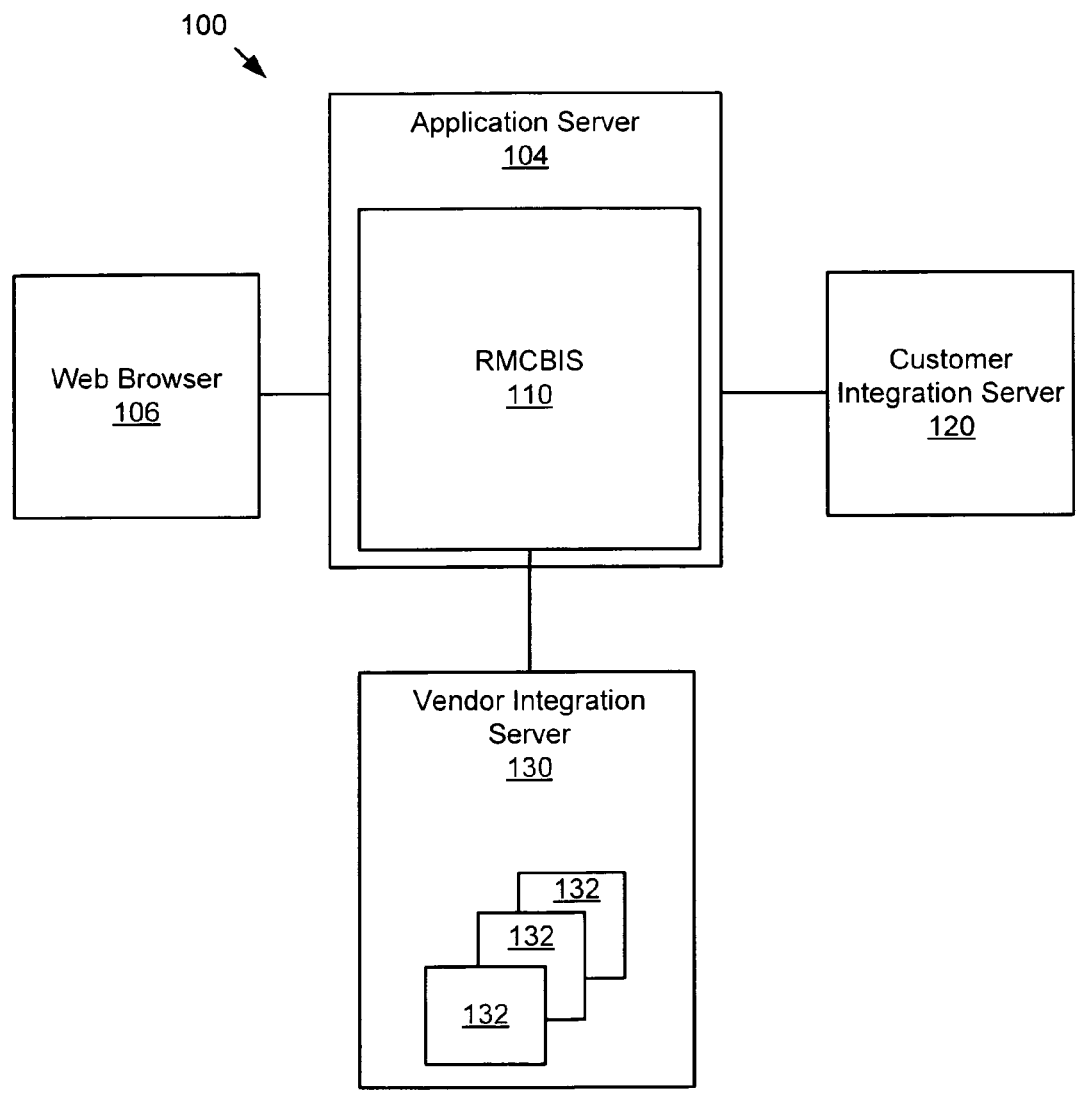
FIG. 1 is a schematic block diagram illustrating one embodiment of a remote management console for business integration scenarios in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium or a computer useable medium may take any form capable of generating a signal, causing a signal to be generated, or causing execution of a program of machine-readable instructions on a digital processing apparatus. A signal bearing medium or a computer useable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system 100 that implements a remote management console for business integration scenarios. The system 100 comprises an application server 104, one or more customer integration servers 120, and a vendor integration server 130 (VIS 130). The system 100 may further comprise a web browser 106. The system 100 enables a vendor to easily deploy a customizable business integration solution to a customer integration server 120.

The system 100 performs dynamic customization on a business integration solution to tailor a business integration solution to the environment of a specific customer integration server 120. The customized business integration solution executes, runs, or is executed on the customer integration server 120. The design of the system 100 allows the customer integration server 120 to be located at a customer site while the VIS 130 is located at a vendor site. A vendor or business partner creates and stores business integration solutions at the vendor site on the VIS 130. The system 100 provides the means to dynamically deploy and customize vendor created business integration solutions to a customer integration server 120 at a customer site while maintaining customer and vendor security.

The application server 104 is a computer system configured to run applications. The applications may comprise object code, byte code, HTML pages, java server pages, java servlets, active server pages (ASPs), common language runtime code, java beans, enterprise java beans, and the like. The application server 104 runs a remote management console for business integration scenarios 110 (RMCBIS 110). The RMCBIS 110 may be implemented in various computer languages and may be broken up into various modules running on a single application server 104 or on a plurality of application servers 104.

In one embodiment of the present invention, the application server comprises a web server capable of serving HTML pages and java server pages. The application server 104 is further capable of running java servlets and Java 2 Enterprise Edition applications including enterprise java beans. The RMCBIS 10 may comprise web pages, java server pages, java servlets, enterprise java beans, native language compiled code files, as well as text files. The RMCBIS 110 may present a web interface to the web browser 106, allowing external reporting and control of the RMCBIS 1lO.

The vendor integration server 130 (VIS) stores business integration solutions 132 for access and deployment. In one embodiment, the VIS 130 is ajava application server that sends a list of available business integration solutions 132 in response to a business integration solution query. In another embodiment, the VIS 130 is a file system that stores various business integration solutions 132 for retrieval by the RMCBIS 110.

A vendor who develops the business integration solutions 132 may build and maintain the VIS 130. In this way, vendors may control development and availability of their business integration solutions 132 that are deployable by the RMCBIS 110 to a customer integration server 120.

The customer integration server 120 may be a computer system configured to interface with one or more enterprise information systems. In one embodiment of the system 100, the customer integration server 120 is located at a customer location while the VIS 130 is located at a vendor location. A customized business integration solution is deployed to the customer integration server 120 and runs as part of the customer integration server 120. The customer integration server 120 may be an application server configured to run java applications, java beans, and java servlets. Alternatively, the customer integration server 120 may be a computer system configured to execute a business integration solution delivered as text files, object code, byte code, java class files, java libraries, source code, MISL (Microsoft Intermediate Language), or the like, as well as combinations thereof.

Figure 2:
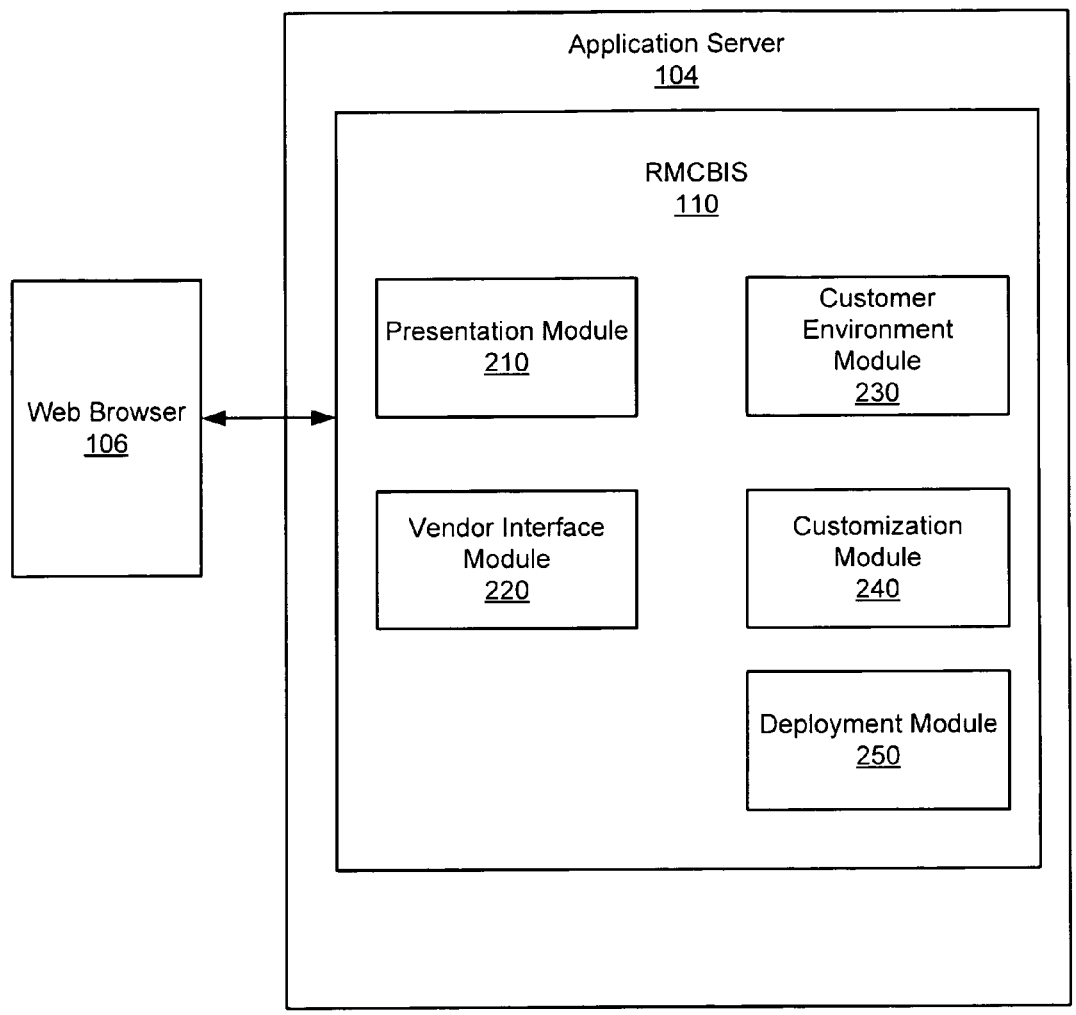
FIG. 2 is a schematic block diagram illustrating one embodiment of a remote management console for business integration scenarios in accordance with the present invention.

FIG. 2 depicts an expanded view of one embodiment of a remote management console for business integration scenarios 110 running on an application server 104. The optional web browser 106 communicates with the RMCBIS 110 providing an external interface to the RMCBIS 110.

The RMCBIS 110 comprises a vendor interface module 220, a customer environment module 230, a customization module 240, and a deployment module 250. Optionally, the RMCBIS 110 may further comprise a presentation module 210. The modules of the RMCBIS 110 may be implemented as a single software program running on one computer system, as a plurality of software programs running on one computer system, or as a plurality of software programs running on a plurality of computer systems.

In one embodiment the RMCBIS 110 is implemented using the model/view/controller (MVC) design pattern. In the MVC embodiment, a remote data manager may be implemented comprising the functionality of the vendor interface module 220, the customization module 240, and the deployment module 250 while the view is mainly implemented by the presentation module 210. The controller may be implemented separately to handle event processing and to call the appropriate functionality in the model and the view. In the MVC embodiment, the view may be implemented as a series of java server pages, the controller may be implemented as java servlets, and the model may be implemented as a servlet or as an enterprise java bean. The modules may also be implemented using other design patterns and technologies known to those of ordinary skill in the art.

In one embodiment, the presentation module 210 is implemented as a set of java server pages and HTML pages served by a web server. The presentation module provides an external interface through which a vendor or a customer may access the RMCBIS 110. The presentation module 210 may present options to the web browser 106 and report results of selected actions.

The vendor interface module 220 may communicate with the vendor integration server 130 (VIS) to retrieve a list of business integration solutions 132 available on a particular VIS 130. The vendor interface module 220 may communicate using a web protocol such as SOAP or HTTP, a file sharing protocol such as NetBIOS, Netware, Network File System protocol, or another communications protocol known to those of ordinary skill in the art. For communications that traverse a public network, the transport preferably uses a security mechanism such as SSL and/or HTTPS to protect communications from eavesdroppers.

The vendor interface module 220 may deliver the list of business integration solutions 132 for presentation by the web browser 106. In one embodiment, the presentation module 210 presents the list of business integration solutions 132 retrieved by the vendor interface module 220. The presentation module 210 may receive a selection of a business integration solution 132. A customer or vendor using the web browser 106 may select a business integration solution 132 for deployment to a customer integration server 120. Alternatively, the selection of a business integration solution 132 may determined by a configuration setting in the RMCBIS 110.

The customer environment module 230 retrieves environment information pertinent to the environment of the customer integration server 120. Environment information may comprise various types of information related to the customer integration server 120 and associated enterprise information systems (EISs). Environment information may comprise the names and versions of business integration solutions 132 currently loaded and/or executing on the customer integration server 120, the names and version numbers of EISs connected to the customer integration server 120, network and file path information pertaining to databases associated with the customer integration server 120 and the EISs, and the like. Environment information may further comprise authentication information such as user names, passwords, security tokens, public key values, and private key values necessary to access the customer integration server 120 and associated EISs.

The customization module 240 modifies a business integration solution 132 according to environment information retrieved by the customer environment module 230. Modifications may include adding a user name and password to a business integration solution 132 such that the business integration solution 132 may access a database repository without further operator intervention. In addition, the customization module 240 may encrypt portions of the business integration solution 132 and calculate checksums to ensure that the business integration solution 132 may properly comply with security requirements. The customization module 240 modifies a business integration solution 132 as necessary to allow the business integration solution 132 to execute in the environment of the customer integration server 120.

The deployment module 250 delivers the customized business integration solution 132 to the customer integration server 120. The deployment module 250 may further cause the customized business integration solution 132 to start execution on the customer integration server 120. The deployment module 250 may rely on the customizations provided by the customization module 240 to properly deploy the customized business integration solution 132.

Figure 3:
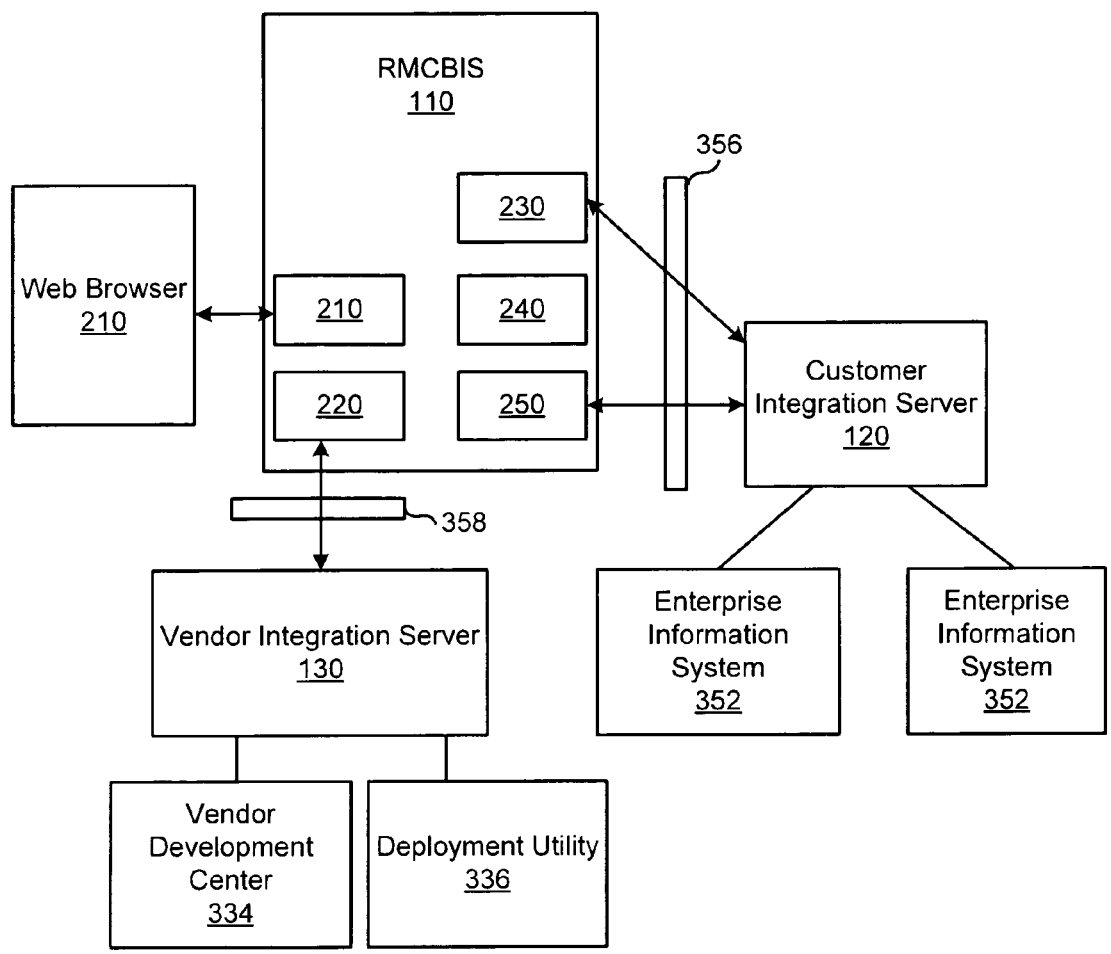
FIG. 3 is a schematic block diagram illustrating one embodiment of a remote management console for business integration scenarios in accordance with the present invention.

FIG. 3 depicts one embodiment of the RMCBIS 110 in the context of a customer integration server 120 connected to two enterprise information systems 352 (EISs) and a vendor integration server 130 associated with a vendor development center 334 and a deployment utility 336.

An enterprise information system 352 comprises one or more applications that comprise an enterprise's existing system for handling companywide information. One company may use a single EIS 352 or a plurality of EISs 352. For example, a company may use an Oracle® EIS 352 to manage companywide accounting information and a PeopleSoft® EIS 352 to manage companywide personnel information. From time to time, it is necessary for two EISs 352 to exchange data. For example, a personnel EIS 352 may notify an accounting EIS 352 of personnel changes that may affect payroll.

Data associated with a change in one EIS 352 may be encapsulated in a business object and forwarded to an associated customer integration server 120. A business object is a set of data or attributes that represent a business entity (such as an Employee) and an action on the data (such as a create or update operation). The customer integration server 120 modifies the business object to make it useable by a second EIS 352. In modifying the business object, the customer integration server 120 may adjust attributes, values, indexes, pointers, and other data fields that identify data structures in the first EIS 352 to relate to corresponding structures in the second EIS 352.

The deployed customized business integration solution 132 runs or executes as part of the customer integration server 120 on which it is deployed. The business integration solution 132 may comprise business logic to modify business objects received from one EIS 352 prior to delivery to a second EIS 352. Alternatively, a business integration solution 132 may create a new business object.

For example, an inventory EIS 352 may report that the inventory level for screwdrivers has fallen below a predetermined re-order level. The customer integration server 120 receives the business object reporting the low screwdriver inventory level. A business integration solution 132 running in the EIS 352 may process the screwdriver level business object and generate a purchase order business object for delivery to a purchasing EIS 352. In this manner, the business solution may create a new business object based on the circumstances encountered and the business logic contained in the business integration solution 132. Alternatively, the business integration solution 132 may simply modify the attributes in the screwdriver level business object to make the object readable by the second EIS 352 and pass the modified business object on to the second EIS 352.

The customized business integration solution 132 may comprise logic tailored to modify business objects from one EIS 352 to make them useable by the second EIS 352. Alternatively, the customized business integration solution 132 may create new business objects to be processed by the original EIS 352 or a second EIS 352.

As discussed above, the VIS 130 maintains business integration solutions 132 for deployment by the RMCBIS 110 to customer integration servers 120. In one embodiment, the VIS 130 is managed and maintained by a vendor of business integration solutions 132. The vendor may utilize a vendor development center 334 to design, develop, and test generic business integration solutions 132. A generic business integration solution 132 is a business integration solution 132 that is designed to run on a general customer integration server 120. The generic business integration solution 132 is designed to be customized and tailored to a specific customer environment. Advantageously, the vendor carefully designs, develops, and tests the generic business integration solution 132 in a test environment. Prior to deployment, the business integration solution 132 has received extensive testing and review.

The cost of testing and maintaining new applications far exceeds the cost of developing new applications. By developing generic business integration solutions 132, the vendor is able to leverage development and test costs over a greater number of customers. The customer receives a higher quality, more thoroughly tested product and the vendor provides rapid deployment of customized solutions.

The vendor may also provide a deployment utility 336 configured to assist in the deployment of the business integration solution 132. The deployment utility 336 may be situated at the vendor site (as shown in FIG. 3), as part of the RMCBIS 110, or at the customer site. The deployment utility 336 allows a vendor or service personnel to deploy the business integration solution 132 to the VIS 130 or to the RMCBIS 110, or to the customer integration server 120.

The vendor may implement a firewall 358 to protect the VIS 130 from unauthorized accesses. The firewall 358 only allows properly authorized accesses from the RMCBIS 110. The operator of the presentation module 210 or of the RMCBIS 110 may provide security tokens, user names, and/or passwords to allow the RMCBIS 110 to access the VIS 130 through the firewall 358.

Figure 4:
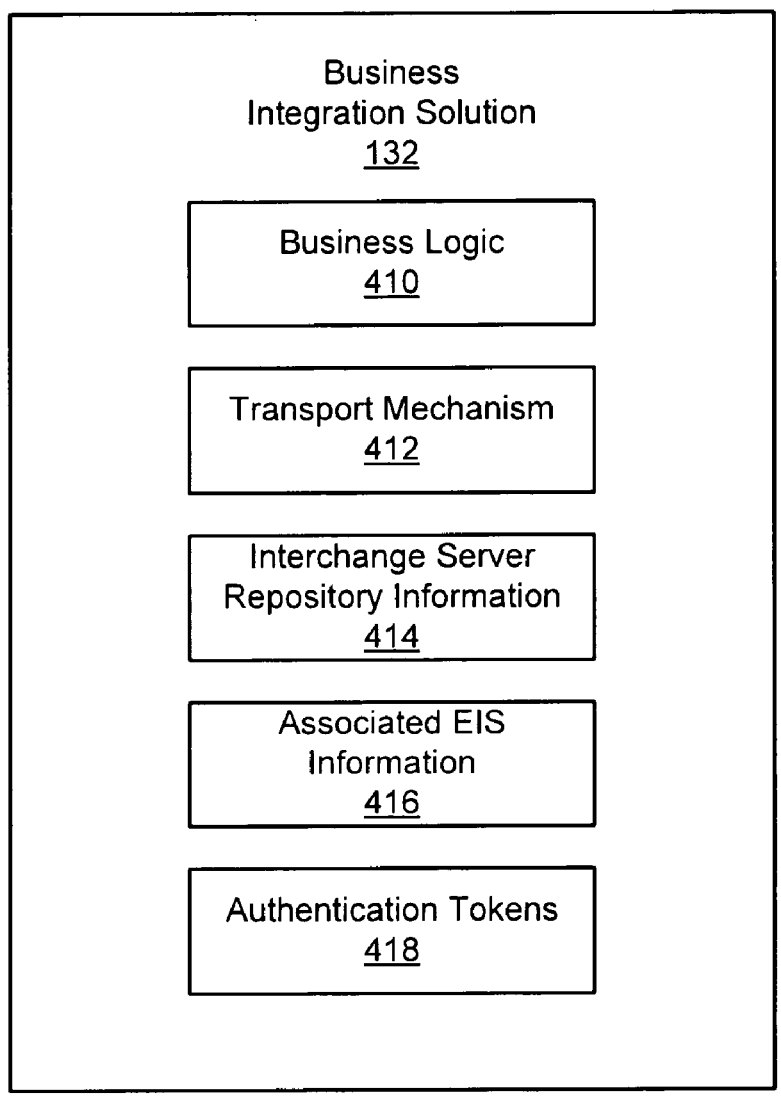
FIG. 4 is a schematic block diagram illustrating one embodiment of a business integration solution in accordance with the present invention.

FIG. 4 depicts a business integration solution 132. The business integration solution 132 may comprise business logic 410, a transport mechanism 412, interchange server repository information 414, associated EIS information 416, and authentication tokens 418, as well as other data necessary for the business integration solution 132 to execute properly in the environment of the customer integration server 120.

In one embodiment, the business integration solution 132 is a collaboration containing business logic 410 describing a distributed business process. The business integration solution 132 may coordinate and extend the business processes of disparate EISs 352. The business integration solution 132 may execute as an application running on the customer integration server 120. Alternatively, the customer integration server 120 may execute the business logic 410 of the business integration solution 132 as a script to execute as a sub-procedure of a larger application.

In one embodiment, the business integration solution 132 comprises a java class file, a java source file, text files, or combinations thereof. The business integration solution 132 may execute as an enterprise java bean on the customer integration server 120 or on an EIS 352. In another embodiment, the business integration solution 132 may comprise Microsoft Intermediate Language code (MSIL), executable in a common language runtime (CLR) environment on a customer integration server 120. In another embodiment, the business integration solution 132 may comprise compiled object code that executes on the customer integration server 120. The object code may implement a COM (Common Object Model) object or other compiled program that may implement an interface generated from an IDL (interface definition language) such as a COM interface or a CORBA (Common Object Request Broker Architecture) interface.

In one embodiment, the business integration solution 132 provided by the VIS 130 is designed, developed, and tested such that the business integration solution 132 may be customized for specific environments particular to specific customer integration servers 120 and associated EISs 352. In one embodiment, the business logic 410 may be codified as source code that may be compiled to an intermediate language or a binary executable by the customization module 240 of the RMCBIS 110. Alternatively, the customer integration server 120 itself may compile and execute source code found in the business integration solution 132.

The transport mechanism 412 may specify communication protocols and parameters that the customer integration server 120 may use internally to execute the business integration solution 132. Additionally, the transport mechanism 412 may comprise communication protocols and parameters necessary for the customer integration server 120 to communicate with an interchange server repository. The communication protocols my include one or more of the following technologies: Java Message Service (JMS), TCP/IP, COM, CORBA, HTTP, HTTPS, and JDBC.

An interchange server repository is a permanent data store maintained by the customer integration server 120, the RMCBIS 110, or an EIS 352. The interchange server repository information 414 comprises directory and path information necessary to access an interchange server repository. The interchange server repository information 414 may further comprise data attributes to be stored in an interchange server repository.

The associated EIS information 416 comprises environment information necessary to interface with attached EISs 352. For example, the associated EIS information 416 may comprise a network path to an associated EIS 352 as well as version information specific to an associated EIS 352. The authentication token 418 may comprise user names, passwords, encryption keys, public keys, private keys, and other tokens necessary for the business integration solution 132 to authenticate itself to the customer integration server 120 and associated EISs 352.

The business integration solution 132 may comprise further information, data, and business logic necessary to allow the business integration solution 132 to execute in the environment of the target customer integration server 120. The customization module 240 of the RMCBIS 110 modifies the generic business integration solution 132 to tailor and customize the business integration solution 132 to execute properly in the environment of a specific target customer integration server 120.

Figure 5:
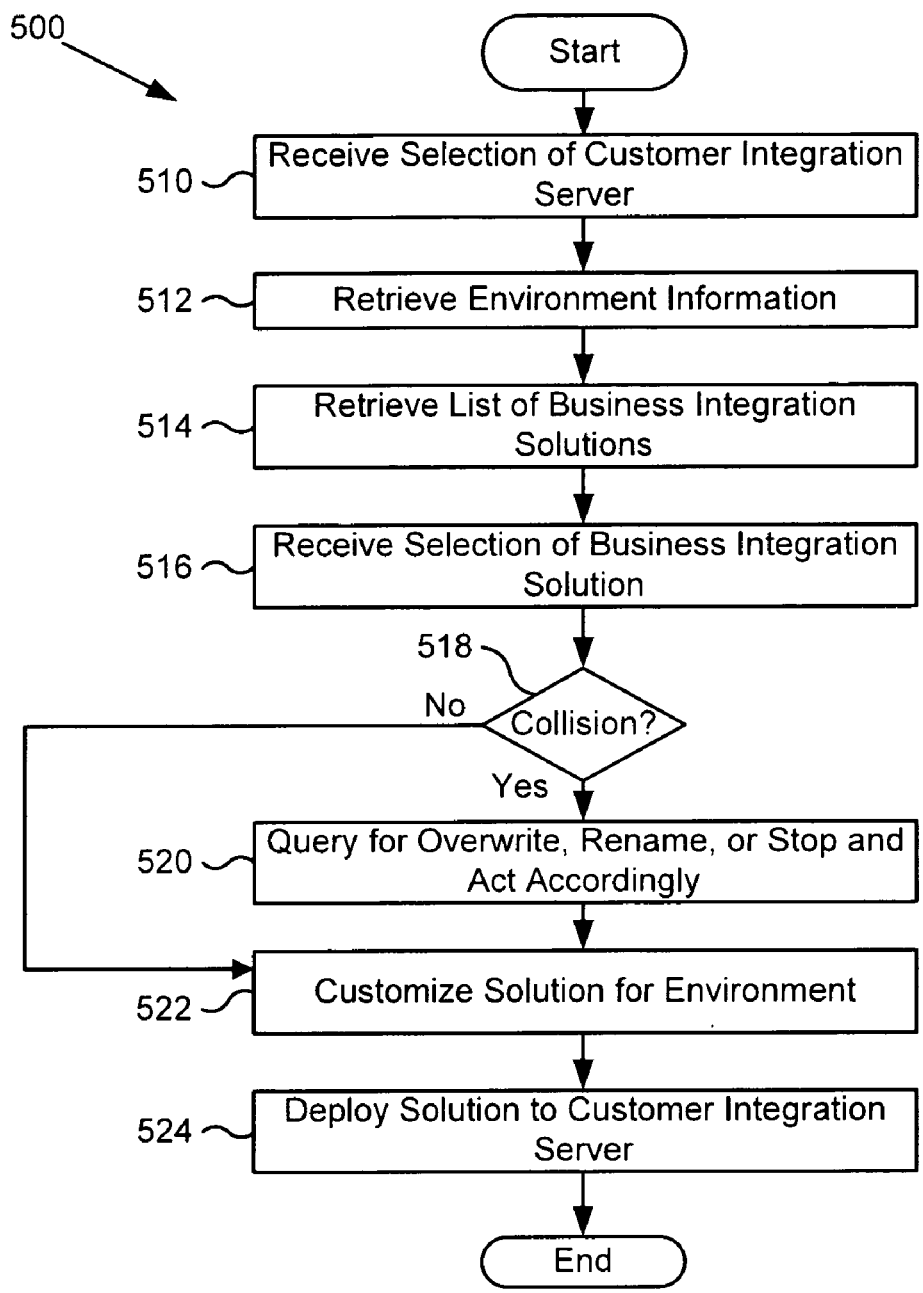
FIG. 5 is a schematic flow chart diagram illustrating one embodiment of a remote management console for business integration scenarios method in accordance with the present invention.

FIG. 5 depicts one embodiment of a method 500 for implementing a remote management console for business integration scenarios 110. The method 500 comprises actions that may be executed in many different sequences. The ordering of the actions in FIG. 5 that the illustrated sequence is essential to the invention. In fact, the dynamic requirements of a specific implementation may modify the sequence of actions from one execution of the method 500 to another execution of the method 500.

The method 500 may comprise receiving 510 a selection of a customer integration server 120. A customer or vendor may indicate to the RMCBIS 110 a specific customer integration server 120 to which a business integration solution 132 will be deployed. The customer or vendor may do this by directly configuring or programming the RMCBIS 110 or alternatively by specifying the customer integration server 120 through a web browser 106. A web browser 106 may allow a user to specify a customer integration server 120 to the presentation module 210 by selecting a customer integration server 120 from a list, by specifying a network address, or in a similar way.

The method 500 may further comprise the customer environment module 230 retrieving 512 environment information from the selected customer integration server 120. The environment information may specify the network address of the customer integration server 120, authentication tokens, operating system information, version information, the names of concurrently running applications, and the like. The environment information may also comprise a list of business integration solutions 132 currently deployed on the target customer integration server 120. The environment information may further comprise information specific to associated EISs 352. The web browser user may supply authentication information to allow the RMCBIS 110 to communicate with the target customer integration server 120 through the firewall 356 to retrieve 512 the desired environment information.

The method 500 may further comprise the vendor interface module 220 retrieving 514 a list of business integration solutions 132 available from a VIS 130. The web browser user may supply authentication information to allow the RMCBIS 110 to communicate with the VIS 130 through the firewall 358 to retrieve 514 the available business integration solutions 132.

In one embodiment, the vendor interface module 220 specifies to the VIS 130 customer environment information. The VIS 130 may use the customer environment information as well as the identity of the requester to limit the type and number of available business integration solutions 132.

The method 500 may further comprise the RMCBIS 110 receiving 516 a selection of a business integration solution 132 from the list of business integration solutions 132 provided by the VIS 130. The RMCBIS 110 may make the selection according to configuration settings or alternatively, a web browser user may make the selection.

The method 500 may further comprise the RMCBIS 110 determining 518 whether a collision exists between the selected business integration solution 132 and business integration solutions 132 already deployed on the target customer integration server 120. Collisions may occur when a business integration solution 132 currently deployed on the customer integration server 120 executes the same, similar, or conflicting functionality as a business integration solution 132 selected for deployment.

If a collision exists, the RMCBIS 110 through the presentation module 210 or other mechanism may query 520 an operator for a desired course of action. The operator may choose to abort the deployment. Alternatively, the operator may decide to overwrite the conflicting deployed business integration solution 132. The operator may backup the conflicting deployed business integration solution 132 prior to deployment of the selected business integration solution 132. The logic for handling collisions may be executed immediately after the retrieval of environment information by the customer environment module 230 or at other times in the execution of the method 500.

If no collision is detected or after the collision is resolved, the customization module 240 customizes 522 the selected business integration solution 132 for deployment on the target customer integration server 120. The customization module 240 may customize 522 the business integration solution 132 as described above. The customization module 240 incorporates environment information retrieved by the customer environment module 230 into the business integration solution 132. The customization module 240 may embed authentication tokens 418, associated EIS information 416, interchange server repository information 414, and information related to the transport mechanism 412 to be utilized by the business integration solution 132. The customization module 240 may further modify the business logic 410 contained in the business integration solution 132. For example, the customization module 240 may compile source code modules or modify text files to include specific environment information.

The method 500 may further comprise the deployment module 250 deploying 524 the customized business integration solution 132 to the target customer integration server 120. In one embodiment, deployment requires the deployment module 250 to copy the customized business integration solution 132 to a specific directory on the customer integration server 120. The deployment module 250 may utilize authentication tokens to traverse a firewall 356 that protects the customer integration server 120 from unauthorized accesses.

The remote management console for business integration scenarios 110 provides a system and a method for customizing and deploying business integration solutions 132. The RMCBIS 110 may be implemented on a java application server such as IBM Websphere or other such servers. The customer integration server 120 may also be implemented as part of a java application server such as IBM Websphere. The RMCBIS 110 allows vendors to design, develop, and test generic business integration solutions 132 that may be customized for specific environments and deployed to business integration solutions 132.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable storage medium having a computer readable program, wherein the computer readable program when executed on a computer causes the computer to:
retrieve environment information from a customer integration server communicating with a plurality of Enterprise Information Systems (EISs), the environment information describing traits of the customer integration server and the plurality of EISs;
customize a business integration solution according to the retrieved environment information, the business integration solution integrating a first business process of a first EIS with a second business process of a second EIS; and
deploy the customized business integration solution to the customer integration server.

2. The computer program product of claim 1, wherein the computer readable program further causes the computer to retrieve the business integration solution from a vendor integration server.

3. The computer program product of claim 2, wherein the business integration solution comprises a generic business integration solution configured to accept deployment-time customizations according to the retrieved environment information, wherein an uncustomized generic integration solution is incapable of operating in an environment of the customer integration server and wherein the customizations configure the generic business integration solution to operate in the environment of the customer integration server.

4. The computer program product of claim 1, wherein retrieving the environment information from the customer integration server further comprises retrieving the environment information from a plurality of customer integration servers and customizing the business integration solution comprises customizing the single business integration solution differently for each of the plurality of customer integration servers according to the environment information retrieved for each of the plurality of customer integration servers.

5. The computer program product of claim 1, wherein retrieving the environment information from the customer integration server comprises retrieving information related to an interchange server repository to which the customer integration server connects comprising information selected from the group consisting of an interchange server repository file system path, an interchange server repository type, an interchange server repository version, an interchange server repository network path, and interchange server repository authentication information.

6. The computer program product of claim 1, wherein the computer readable program further causes the computer to:
retrieve a set of business integration solutions from a vendor integration server;
present at least one of the set of business integration solutions to a user of the customer browser;
accept a selection of the business integration solution from the set of business integration solutions; and
prompt the user of the customer browser with a choice of deployment actions with respect to deploying the selected business integration solution onto the customer integration server, the deployment actions selected from the group consisting of
overwriting a similarly named business integration solution on the customer integration server with the selected business integration solution; and
archiving the similarly named business integration solution to prevent loss of the similarly named business integration solution in response to deployment of the selected business integration solution.

7. The computer program product of claim 5, wherein customizing the selected business integration solution comprises modifying a transport mechanism for the selected business integration solution to match the transport mechanism supported by the customer integration server, the transport mechanism selected from the group consisting of Java Message Service (JMS), Transmission Control Protocol/Internet Protocol (TCP/IP), Common Object Model (COM), Common Object Request Broker Architecture (CORBA), Hypertext Transfer Protocol (HTTP), Hypertext Transfer Protocol Secure (HTTPS), and Java Database Connectivity (JDBC).

8. The computer program product of claim 1, wherein the business integration solution implements a set of business rules to integrate the first business process with the second business process.

9. The computer program product of claim 8, wherein the business integration solution comprises mappings to convert individual fields in a first business object received from the first EIS to individual fields in a second business object useable by the second EIS.

10. A system comprising:
an application server in communication with a customer integration server and a vendor integration server, the customer integration server communicating with a plurality of Enterprise Information Systems (EISs);
a remote management console in communication with the application server, the remote management console comprising:
a customer environment module retrieving environment information from the customer integration server, the environment information describing traits of the customer integration server and the plurality of EISs;
a customization module customizing a business integration solution according to the retrieved environment information, the business integration solution integrating a first business process of a first EIS with a second business process of a second EIS; and
a deployment module deploying the customized business solution to the customer integration server.

11. The system of claim 10, further comprising a presentation module accepting a business integration solution selection wherein the business integration solution selection is accepted from a web browser.

12. The system of claim 10, wherein the customer integration server executes the business integration solution in response to receiving a first business object from the first EIS and wherein the business integration solution transforms data of the first business object for use by the second EIS.

13. The system of claim 10, wherein the business integration solution comprises a generic business integration solution configured to accept deployment-time customizations according to the retrieved environment information, wherein an uncustomized generic integration solution is incapable of operating in an environment of the customer integration server and wherein the customizations configure the generic business integration solution to operate in the environment of the customer integration server.

14. The system of claim 10, wherein the customization module customizing the selected integration business solution comprises inserting Extensible Markup Language (XML) encoded data into the business integration solution that specifies configuration information selected from the group consisting of
a directory path where a first interchange server repository is installed;
a directory path where a collaboration object is installed;
a name of the customer integration server;
a network path to the customer integration server;
an administrator identifier for the customer integration server;
an administrator password for the customer integration server; and
a transport method that the customer integration server utilizes for internal interobject communication.

15. A method for deploying computing infrastructure comprising:
receiving customer integration server connection information;
executing a deployment utility configured to integrate a business integration solution into a customer integration server, the deployment utility configured to:
retrieve environment information from the customer integration server communicating with a plurality of Enterprise Information Systems (EISs), the environment information describing traits of the customer integration server and the plurality of EISs;

customize a business integration solution according to the retrieved environment information, the business integration solution integrating a first business process of a first EIS with a second business process of a second EIS; and deploy the customized business integration solution to the customer integration server; and confirming deployment of the customized business integration solution to the customer integration server.

16. The method of claim 15, wherein the deployment utility is further configured to retrieve the business integration solution from a vendor integration server.

17. The method of claim 16, wherein the business integration solution comprises a generic business integration solution configured to accept deployment-time customizations according to the retrieved environment information, wherein an uncustomized generic integration solution is incapable of operating in an environment of the customer integration server and wherein the customizations configure the generic business integration solution to operate in the environment of the customer integration server.

18. The method of claim 15, wherein the deployment utility is further configured to receive a remote request from a customer browser to initiate the retrieval of the environment information.

19. The method of claim 15, wherein retrieving environment information from the customer integration server further comprises retrieving the environment information from a plurality of customer integration servers and customizing the business integration solution comprises customizing the single business integration solution differently for each of the plurality of customer integration servers according to the environment information retrieved for each of the plurality of customer integration servers.

20. The method of claim 15, wherein retrieving the environment information from the customer integration server comprises retrieving information related to an interchange server repository to which the customer integration server connects comprising information selected from the group consisting of an interchange server repository file system path, an interchange server repository type, an interchange server repository version, an interchange server repository network path, and interchange server repository authentication information.

21. The method of claim 15, wherein the business integration solution implements a set of business rules to integrate the first business process of the first EIS with the second business process of the second EIS.

22. The method of claim 21, wherein the business integration solution comprises business logic and data in the form of one or more of Java class files, Java byte code, and Java source code, and wherein the business integration solution executes on a Java application server.

23. The method of claim 22, wherein the Java application server is an IBM Websphere.

24. The system of claim 10, further comprising a vendor interface module retrieving the business integration solution from the vendor integration server.

25. The system of claim 10, wherein the customer environment module retrieves the environment information from a plurality of customer integration servers and the customization module customizes the single business integration solution differently for each of the plurality of customer integration servers according to the environment information retrieved for each of the plurality of customer integration servers.

26. The system of claim 10, wherein the business integration solution comprises business logic and data in the form of one or more of Java class files, Java byte code, and Java source code, and wherein the business integration solution executes on a Java application server.

* * * * *